United States Patent
Oh et al.

(10) Patent No.: US 6,660,058 B1
(45) Date of Patent: Dec. 9, 2003

(54) PREPARATION OF SILVER AND SILVER ALLOYED NANOPARTICLES IN SURFACTANT SOLUTIONS

(75) Inventors: Seong-Geun Oh, Seoul (KR); Sung-Chul Yi, Seoul (KR); Seung-Il Shin, Seoul (KR); Dae-Wook Kim, Seoul (KR); Sung-Hoon Jeong, Seoul (KR)

(73) Assignee: Nanopros, Inc., Fairfax, VA (US)

( * ) Notice: Subject to any disclaimer, the term of this patent is extended or adjusted under 35 U.S.C. 154(b) by 0 days.

(21) Appl. No.: 09/642,829

(22) Filed: Aug. 22, 2000

(51) Int. Cl.$^7$ .................................................. B22F 9/24
(52) U.S. Cl. ............................................. 75/351; 75/371
(58) Field of Search ........................... 75/351, 370, 371

(56) References Cited

U.S. PATENT DOCUMENTS

| | | | |
|---|---|---|---|
| 5,292,359 A | * 3/1994 | Jeng-Shyong et al. | 75/371 |
| 5,514,202 A | * 5/1996 | Lin et al. | 75/371 |
| 5,759,230 A | * 6/1998 | Chow et al. | 75/371 |
| 5,885,535 A | * 3/1999 | Asano et al. | 75/370 |
| 6,110,254 A | * 8/2000 | Johnson et al. | 75/371 |
| 6,290,749 B1 | * 9/2001 | White et al. | 75/721 |

FOREIGN PATENT DOCUMENTS

| JP | 61-276904 | * 12/1986 | 75/370 |
|---|---|---|---|
| JP | 61-276905 | * 12/1986 | 75/370 |
| JP | 61-276906 | * 12/1986 | 75/370 |

* cited by examiner

Primary Examiner—George Wyszomierski
(74) Attorney, Agent, or Firm—Joseph Hyosuk Kim; JHK Law

(57) ABSTRACT

The present invention relates to the preparation of nanoparticles of silver (Ag) and silver alloyed with other elements such as platinum (Pt), palladium (Pd), gold (Au), aluminum (Al), cadmium (Cd) and sulfur (S) in surfactant solutions. The surfactant molecules have the intrinsic property to adsorb into the interface, which are formed between two different phases. Thus, the surfactant molecules would adsorb into the surface of nuclei in solution. The adsorbed surfactant molecules from the solution prevent the coalescence of particles and control the rate of particle growth. By choosing the proper kind and/or concentration of surfactants, the size of particles formed in solution can be controlled in nm scale.

10 Claims, 6 Drawing Sheets

PREPARATION OF SILVER AND SILVER ALLOYED NANOPARTICLES IN SURFACTANT SOLUTIONS

BACKGROUND OF THE INVENTION

Colloidal sols of dispersed particles such as metals, semiconductors, polymers, have attracted considerable interest due to their photochemical, photocatalytic, and photovoltaic properties or to their optical non-linearities, see Takami A. et al., Jpn. J. Appl. Phys., 35:L781, (1996).

For silver, there has been interested in investigating its optical properties since it strongly absorbs in the visible region due to plasmon resonance. Also, silver has long been known as an antiseptic with the power to kill bacteria and other germs. Ancient Greeks and Romans kept their liquid free of contamination by placing them in silver jars. In a study done, in part, by the institute of Microbiology in Rome, Italy, and published in "Applied and Environmental Microbiology", in December, 1992, various forms of silver were tested for their ability to kill microorganisms. Silver particles are 100 times more effective than silver salts as antiseptics. Thus, it is important to prepare nano-sized silver particles or silver alloyed particles to maximize the performance of silver in killing microorganisms. Conventionally, silver nanoparticles have been prepared by various methods such as co-precipitation methods in aqueous solutions, electrochemical methods, aerosol, reverse microemulsion, chemical liquid deposition, photochemical reduction, chemical reduction in solution and UV irradiation. But all of these methods have limitations in controlling the particle size and production of particles on an industrial scale. To overcome these limitations, recently, surfactants have been used (WO 99/43427).

It is well known that surfactants provide several types of well-organized assemblies, which provide the specific size, geometry and stabilization to particulate assemblies formed within the organized surfactant assemblies. Table I shows some of the conventionally used host surfactant assemblies that are available for the formation of nanoparticle species which include aqueous micellar solution, reverse micelle, microemulsion, vesicle, monolayer, Langmuir-Blodgett films and bilayer lipid membranes (Dixit et al., Colloids and Surfaces A: Engineering and Physico-Chemical Aspects, 133:69 (1998)).

In this invention, we describe the preparation of nanoparticles of silver and silver alloyed with other elements such as platinum (Pt), palladium (Pd), gold (Au), aluminum (Al), cadmium (Cd) and sulfur (S) in aqueous surfactant solutions. Depending on the nature of the prepared materials, two types of adsorption may be considered: hydrophobic portions will bind hydrophobically with other hydrophobic parts of the surfactant, and in the same way, hydrophilic portions will bind hydrophilically with the other hydrophilic parts of the surfactant.

Furthermore, two kinds of binding behavior can be observed according to the surface charge of the particles and surfactant head groups. In one case, if the ionic surfactant has an opposite charge to the particle, the hydrophilic head groups of the surfactant bind to the particle, wherein the particle becomes hydrophobic. This type of a surfactant-covered particle cannot be kept in an aqueous environment, unless a double-layer of surfactant molecules is formed. However, this is difficult to achieve with very small colloidal particles. In the second case, if the ionic surfactant head group has the same charge as the particle surface, the binding of the surfactant head groups does not occur. Thus, the type of ionic charge of the head groups in surfactant molecules is very important in relation to the adsorptive ability of the surfactant to bind to the particle surface, and affects the size of the particles formed in surfactant solutions. Due to the above-mentioned mechanism, the kind of hydrophilic group in surfactant influences the particle size formed in surfactant solutions. Thus, there is a need in the art to efficiently produce silver containing nanoparticles by using a simple method.

SUMMARY OF THE INVENTION

The present invention has met the herein before described need.

It is an object of the present invention to provide a simple preparation method for silver and silver alloyed nanoparticles having a well-controlled size in a surfactant solution. It is a further objective of this invention to provide an economic and simple preparation method for silver alloyed with other inorganic elements such as Pt, Pd, Au, Al or S to modify the physico-chemical properties of silver nanoparticles in a surfactant solution.

The procedure for the formation of size-controlled silver nanoparticles in surfactant solutions can be described as follows: (step 1) prepare an aqueous silver salt solution such as silver nitrate, silver acetate or other water soluble silver salts, (step 2) prepare an aqueous solution of a reducing agent of silver ions and surfactant, and (step 3) adding the solution prepared in step 2 into the solution prepared in step 1, or vice versa to form a silver colloid.

For the formation of alloyed silver nanoparticles, a mixed water-soluble salts solution of silver and water-soluble salt is prepared, which can bring together the wanted ions in the same manner as in the above-mentioned step 1. Metals such as palladium nitrate for Ag—Pd alloyed nanoparticles, $HAuCl_4$ for Ag—Au alloyed nanoparticles, and so can be used. For example, the alloyed nanoparticles of silver and palladium can be prepared by mixing a mixed salt solution of silver nitrate and palladium nitrate and adding the aqueous solution of the reducing agent and the surfactant into this solution. Nanoparticles of Ag/Pd alloy are then obtained. In this case, the physico-chemical properties of the particles would be different from those of silver and palladium nanoparticles. The size of the alloyed nanoparticles depends on the kind and/or concentration of surfactant used, similar to the procedure used in the formation of silver nanoparticles.

For the formation of Ag/Au alloyed nanoparticles, silver nitrate and $HAuCl_4$ are dissolved in water at a desired ratio. The aqueous solution of reducing agent such as hydrazine, ethylene glycol, ethylene oxide based chemicals, $NaBH_4$, $LiBH_4$, or $LiAlH_4$ and surfactant are added into a mixed salt solution while stirring. Thus, an alloyed Ag/Au nanoparticles can be obtained.

The size of the nanoparticles can be adjusted by changing the type of the surfactant or the concentration of the surfactant in an aqueous solution. For the silver and alloyed silver nanoparticles, anionic and nonionic surfactants produced fine particles, but the cationic surfactant was not as efficient as anionic or nonionic surfactants possibly due to the positive surface charge of silver particles in aqueous solution.

It is an object of the invention to provide a method for making a nano-sized silver particle comprising:

(i) preparing an aqueous silver salt solution;
(ii) preparing an aqueous solution comprising a silver ion reducing agent;
(iii) preparing an anionic, nonionic or amphoteric surfactant solution, or a mixture thereof; and
(iv) mixing the solutions prepared in steps (i–iii) in any order to form a nano-sized silver particle, wherein the solutions are prepared together or separately.

The surfactant may be present in 0.01–10 weight % when the solutions prepared in steps (i–iii) are combined. The anionic surfactant may include sodium dodecyl sulfate or sodium decyl sulfate. The nonionic surfactant may include an ethylene oxide, alkyl(poly) glucoside or alkylglycerol ether. The amphoteric surfactant may include dodecyl amine oxide and decyl amine oxide. All surfactants comprise 8–12 carbon atoms in the hydrophobic part of the surfactant.

The reducing agent used may be hydrazine, $NaBH_4$, $LiBH_4$, $LiAlH_4$, ethylene glycol, an ethylene oxide based chemical, or an alcohol. And the nano-sized particle may have a diameter of below 200 nanometers or may have a diameter of less than 20 nanometers.

The present invention is also directed to a method for making a nano-sized silver alloyed particle comprising:

(i) preparing separately or together an aqueous silver salt solution and an aqueous inorganic element salt solution, wherein said inorganic element is other than silver;
(ii) preparing separately or together an aqueous solution comprising a silver ion reducing agent and an aqueous solution comprising an inorganic element ion reducing agent;
(iii) preparing an anionic, nonionic or amphoteric surfactant solution or a mixture thereof; and
(iv) mixing the solutions prepared in steps (i–iii) in any order to form a nano-sized particle of silver alloyed with said inorganic element, wherein the solutions are prepared together or separately.

It will be seen that the nanoparticle prepared using the method of the invention may be used for a variety of situation and purposes, some of which are detailed here. For example, an object of the invention is to provide a method for disinfecting or sterilizing a substrate comprising administering to the substrate an effective amount of the nano-sized particle that is obtained using the method according to the invention. Other uses for the nano-sized particle made using the method of the invention include: catalyzing a chemical reaction comprising administering to the reaction an effective amount of the nano-sized particle; chemically or mechanically polishing a surface comprising administering to the surface an effective amount of the nano-sized particle; removing static charge from a substrate, comprising administering to the substrate an effective amount of the nano-sized particle; enhancing electroconductivity in electroconducting materials, comprising administering to the materials an effective amount of the nano-sized particle; and shielding a substrate from the effects of electromagnetic wave, comprising administering to the substrate an effective amount of the nano-sized particle; and enhancing photo-response of a substrate comprising administering to the substrate an effective amount of the nano-sized particle.

In another embodiment, the present invention is directed to a method for preventing oxidation of a substrate comprising administering to the substrate an effective amount of the nano-sized particle together with an anti-oxidant. The anti-oxidant may be butylhydroxy toluene or a vitamin E derivatives, among others, and may be useful for enhancing the health of an individual to ingests the nanoparticle with an anti-oxidant.

These and other objects of the invention will be more fully understood from the following description of the invention, the referenced drawings attached hereto and the claims appended hereto.

BRIEF DESCRIPTION OF THE DRAWINGS

The present invention will become more fully understood from the detailed description given herein below, and the accompanying drawings which are given by way of illustration only, and thus are not limitative of the present invention, and wherein;

FIG. 3(a) shows SDS, which is an anionic surfactant. FIG. 3(b) shows Tween 20, which is a nonionic surfactant. FIG. 3(c) shows NP 9, which is a nonionic surfactant. FIG. 3(d) shows CTAB, which is a cationic surfactant.

DETAILED DESCRIPTION OF THE INVENTION

As used herein, the chemical symbols are based on International Union of Pure and Applied Chemistry (IUPAC) systematic names. For example, Ag, Au, Pd correspond to silver, gold and palladium, respectively.

As used herein, a "nanoparticle" or "nano-sized" particle refers to a particle that is less than or equal to 200 nm in diameter. Preferably, the particle is less than 100 nm. More preferably, the particle is less than 20 nm.

As used herein, "surfactant" refers to a surface active agent which has both hydrophilic and hydrophobic parts in the molecule.

The type of surfactant can be, but is not limited to anionic such as sodium dodecyl sulfate or sodium laurate, nonionic such as Tween 20 or alkylpoly glucoside, or amphoteric such as amine oxide, which has 8–12 carbons atoms in the hydrophobic part.

The amount or concentration of the surfactant used in the invention to achieve a desired nano-sized particle can vary depending on the surfactant that is used. Generally, the amount or concentration of the surfactant used in the invention can be, but is not limited to 0.01 wt. % to 10.0 wt. %. Preferably, the amount is 0.1–5.0 wt. %, more preferably, the amount is 0.1–3 wt. %, still more prefereably, the amount is 0.2–2 wt. %. Most preferably, the amount is 0.3–1.0 wt. %.

Silver colloid are prepared by reduction of aqueous $AgNO_3$ solution (0.05M) using hydrazine solution (0.1M) containing various kinds of surfactant, according to

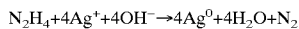

$$N_2H_4 + 4Ag^+ + 4OH^- \rightarrow 4Ag^0 + 4H_2O + N_2$$

First, 20 g of selected surfactant aqueous solution were added into a glass vial. Then, 0.5 g of hydrazine solution containing surfactants was added and mixed homogeneously using a magnetic stirrer for 1 minute. Finally, 0.5 g of $AgNO_3$ was added and the reaction was allowed to proceed. No stirring is necessary after an initial 10 minutes stirring for homogenizing the solution. All experiments were performed at a thermostatic water bath maintained at 27° C. It should be understood that the present invention can be carried out at any temperature in addition to the 27° C. exemplified. The prepared silver colloid was also kept under the same conditions.

Figure 1:
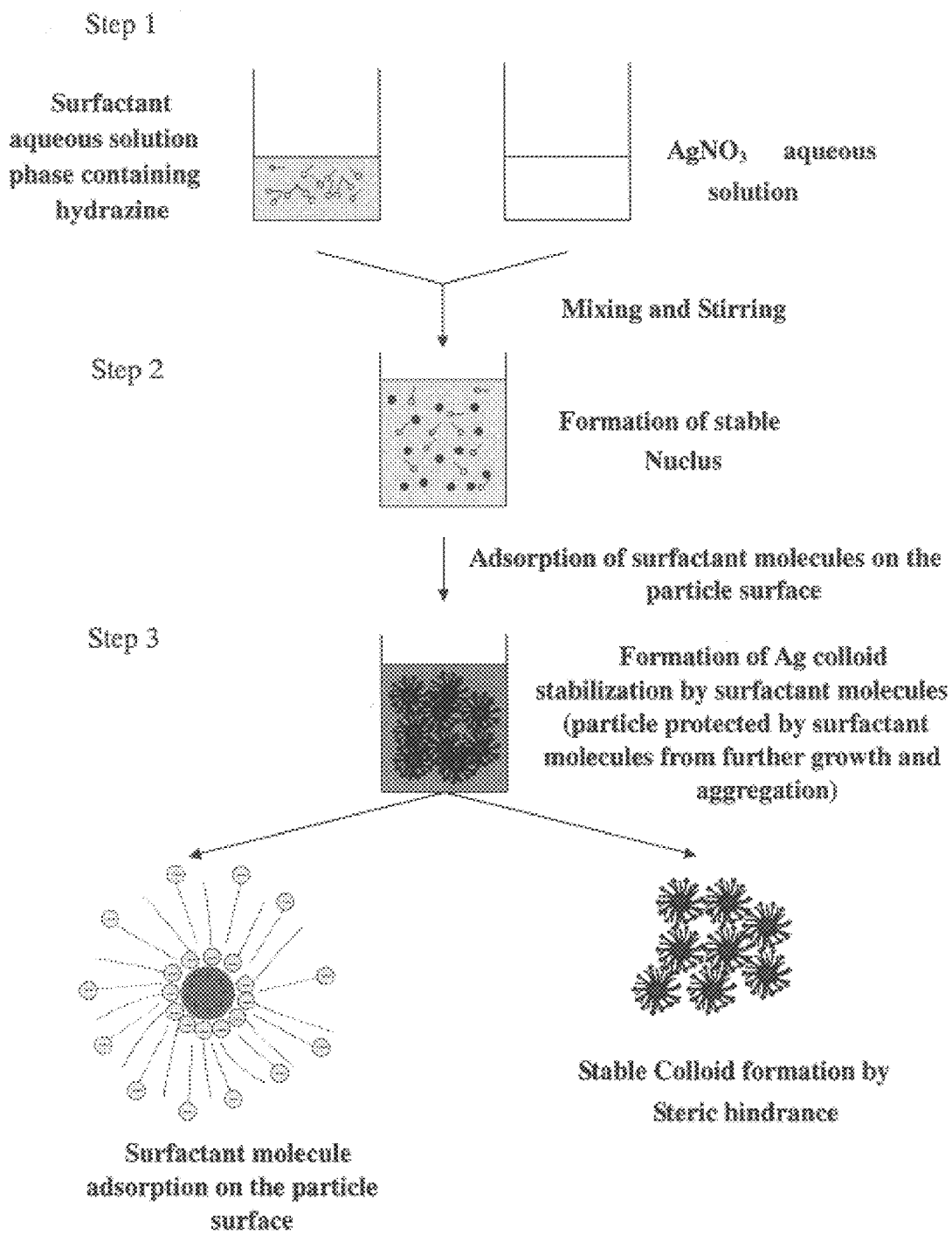
FIG. 1 shows a schematic diagram of size control and stabilization of Ag particles by adsorption of anionic surfactant on the surface of particles.

The formation of silver particles involves three distinct stages: (1) reduction of positive silver ions into silver atoms, (2) nucleation (the formation of centers of crystallization) and (3) crystal growth by coalescence of nuclei or diffusion of silver atoms into the surface of the nuclei. Since surfactant molecules are present in the solution, surfactant molecules would be adsorbed onto the surface of nuclei as soon as they are formed as shown in FIG. 1. This surfactant film will hinder the coalescence of nuclei and deter (or block) the diffusion of silver atoms into the surface of nuclei. Thus, the particle size will be influenced by the characteristics of the surfactant film at the surface of the nuclei. In this invention, the proper kinds or concentration of surfactants are employed as the controller of particle size formed in solution.

The morphology of the silver particles formed in the aqueous surfactant solution using the invention process was studied by transmission electron microscopy (TEM, Jeol Model JEM-2000EXII). Samples were coated with gold by sputtering for 1.0 minute. Photomicrographs were obtained operating at 15 kV, a working distance of 9 mm at 100,000 magnification.

It is well known that adsorption of a nucleophile onto the particle surface increase the Fermi level of silver particle due to its donation of electron density to the particle (Henglein A., J. Phys. Chem., 97:5457 (1993)). Similarly withdrawal of electron density from the particle surface by an electrophile lowers the Fermi level.

Figure 4:
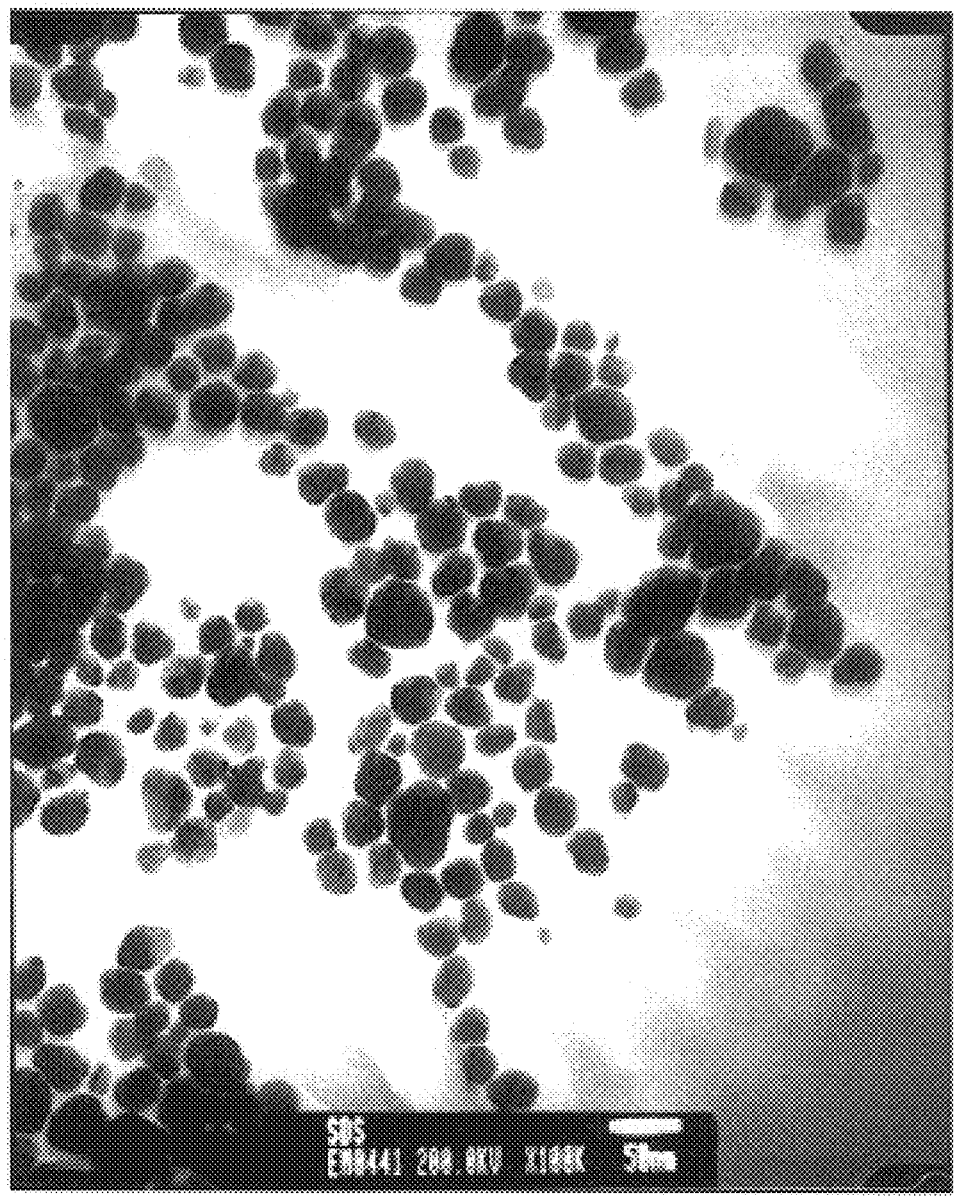
FIG. 4. TEM pictures of silver particles prepared in 0.01M aqueous SDS solution.
Figure 5:
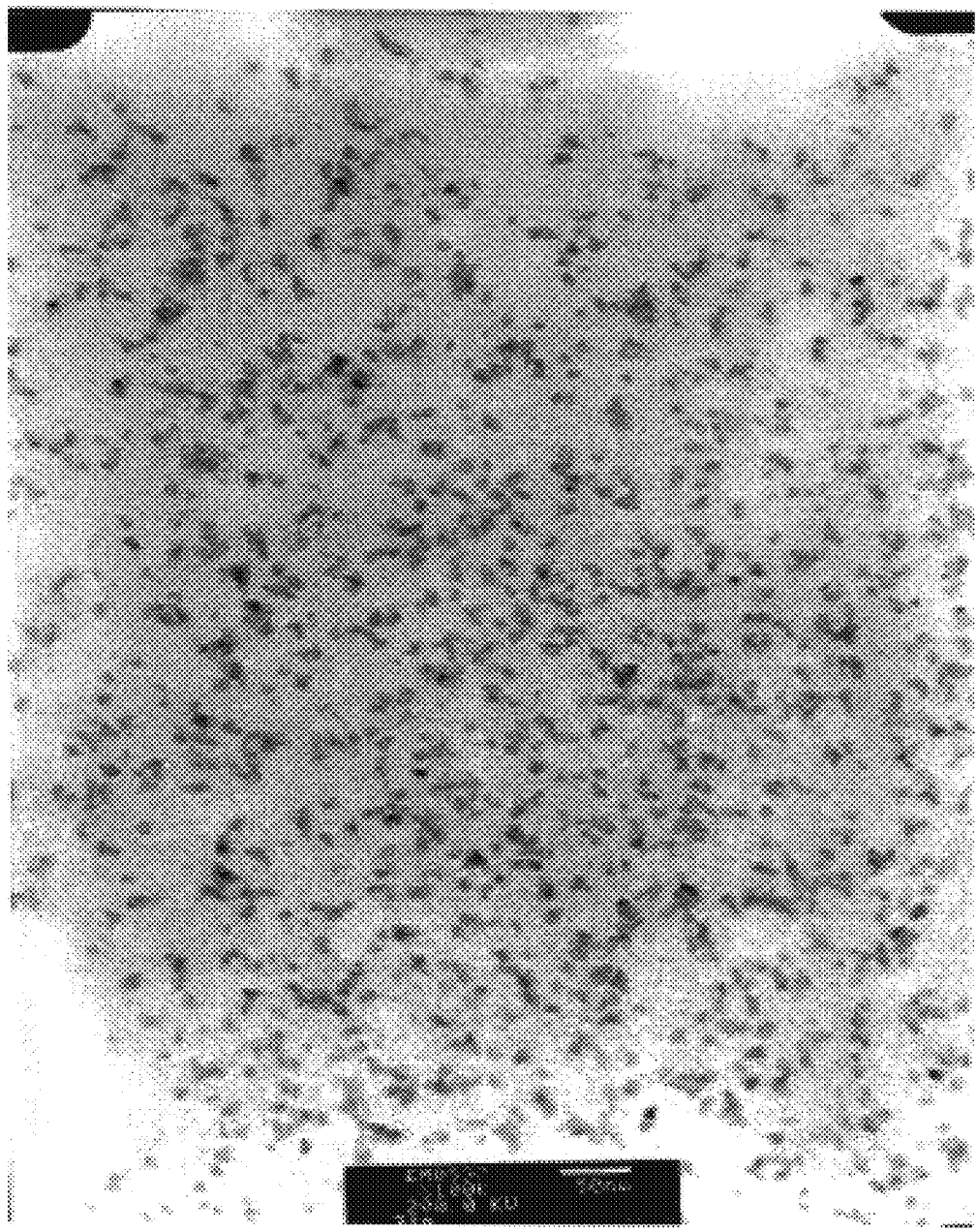
FIG. 5. TEM pictures of Ag—Pd(1:1) composite particles prepared in 0.01M aqueous Tween 20 solution FIG. 6. TEM pictures of Ag—Au(1:1) composite particles prepared in 0.01M aqueous Tween 20 solution
Figure 6:
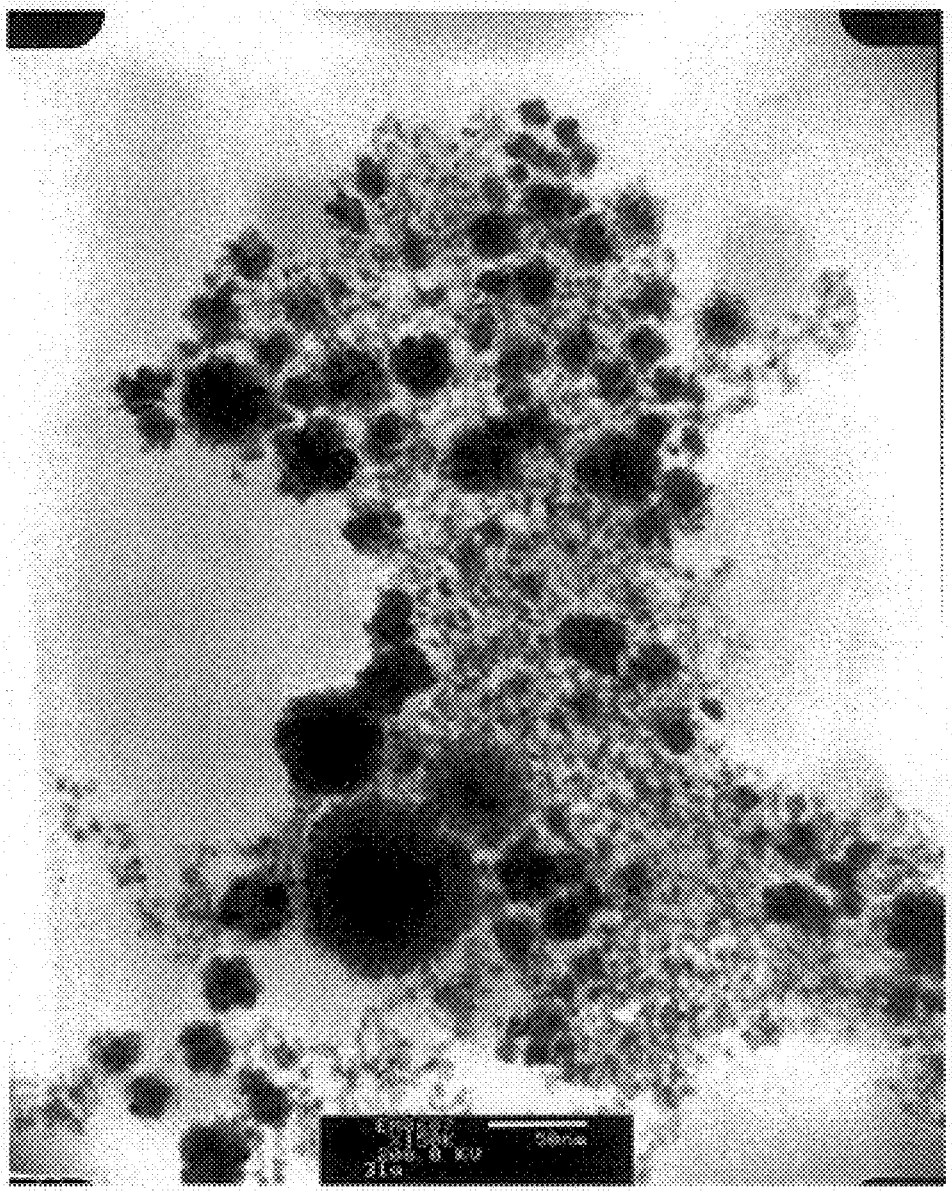

This phenomenon was also reported by Liz-Marzan and Lado-Tourino et. al. (Langmuir 12:3585 (1996)) and the effect on the optical properties of the adsorption of different species onto a metal particle surface has been recently reviewed by P. Mulvaney [in Langmuir, 12:799 (1996)]. Due to these phenomena, sols prepared with different stabilizers often have quite different absorption spectra even though the particle size distribution appear similar. The adsorption of iodide or sulfide ions or of stabilizers as gelatin or PVP onto silver sols leads to a marked red shift, with damping of the plasmon band. This effect is precisely the same as observed here as shown in FIGS. 4–6.

Experimentally, we observed the phenomenon as blue and red shift of the plasmon band, respectively. The observed red shift associated with the addition of surfactant stabilizer, is due to the displacement of nucleophiles (i.e., anions adsorbed on the particle surface) by the surfactants from the surface. UV-visible spectra were measured with a Shimadzu UV-2101PC spectrophotometer. Dynamic light scattering measurements were performed with Malvern Zetamaster instrument at the wavelength 514.5 nm of Ar—Ne at 90° to measure the particle size of Ag and alloyed Ag particles.

The following examples are offered by way of illustration of the present invention, and not by way of limitation.

EXAMPLES

Example 1

Figure 2:
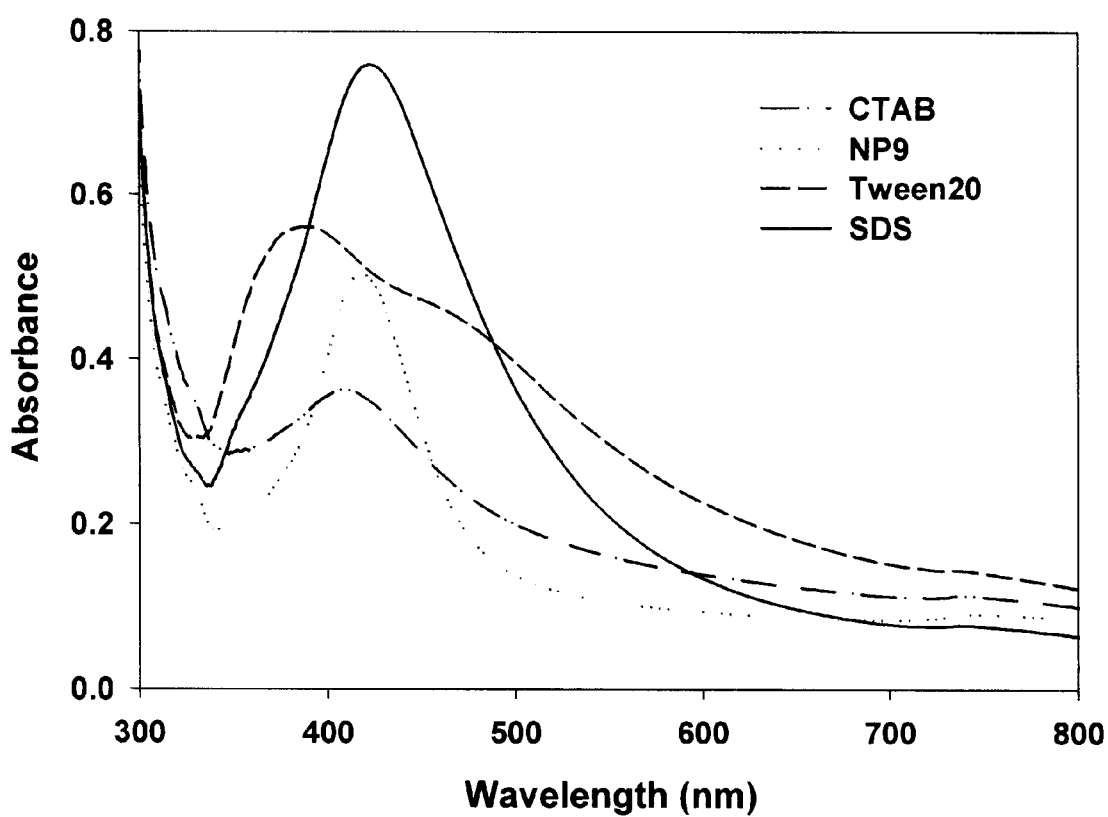
FIG. 2 shows UV absorbance of silver particles prepared in presence of various surfactants as stabilizers (about 6 hours after from reduction).
Figure 3:
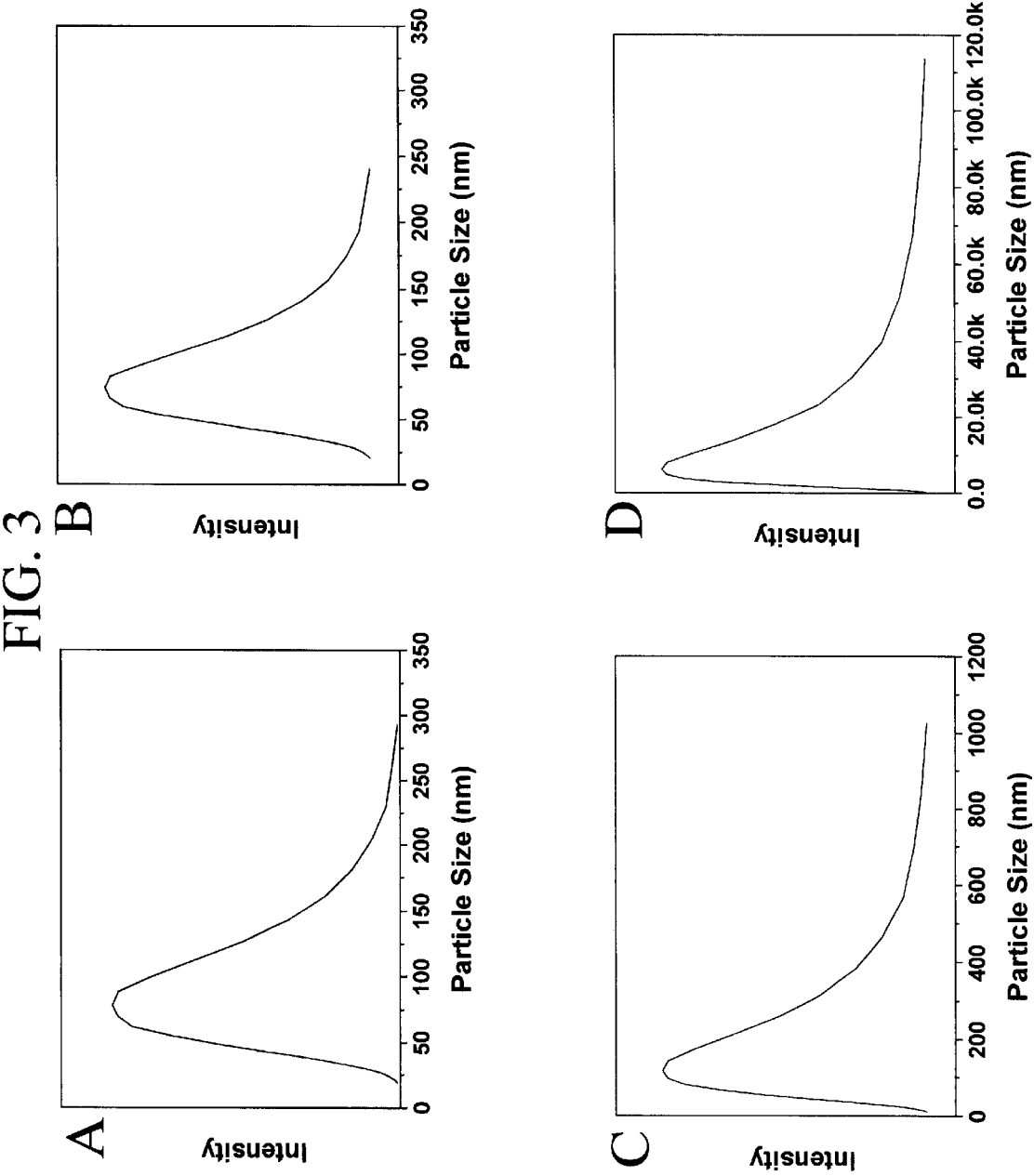
FIGS. 3(a) to 3(d) show particle size distributions of silver particles prepare in various surfactants as stabilizers.

The 0.5 g of hydrazine solution (0.1 M) was added into a solution containing 20 gram of Tween 20 (polyoxyethylene (20) sorbitan monolaurate) (0.01 M). After mixing thoroughly, 0.5 gram of $AgNO_3$ solution (0.05 M) was added into the mixed solution of hydrazine and Tween 20 while still mixing. A yellowish silver colloidal solution was formed, and the UV-absorption spectra of this colloidal solution is shown in FIG. 2. The average particle size is 73.2 nm as shown in FIG. 3 measure by a dynamic light scattering equipment.

Example 2

SDS (Sodium Dodecyl Sulfate) was used in place of Tween 20 in Example 1. The UV-spectra of the obtained silver colloidal solution is shown in FIG. 2, and the average particle size was 64 nm as shown in FIG. 3 and TEM picture shown in FIG. 4.

Example 3

NP-9 (Nonylphenol ethoxylate (9)) was used in place of Tween 20 in Example 1. The UV-spectra of the obtained silver colloidal solution is shown in FIG. 2, and the average particle size was 114.3 nm as shown in FIG. 3.

Example 4

CTAB (CetylTriMethylAmmonium Bromide) was used in place of Tween 20 in Example 1. The UV-spectra of the obtained silver colloidal solution is shown in FIG. 2, and the average particle size was 5.21 μm as shown in FIG. 3. The particle prepared using a cationic surfactant solution results in a micron-sized particle, which is not desirable for the purposes of the present invention.

Example 5

A mixed salt solution (0.025 M of $AgNO_3$+0.025 M of $PdNO_3$) was used in place of $AgNO_3$ solution in Example 1. The average size of the obtained alloyed particle of Ag and Pd was 7 nm as shown in FIG. 5.

Example 6

A mixed salt solution (0.025 M of $AgNO_3$+0.025 M of $HAuCl_4$) was used in place of $AgNO_3$ solution in Example 1. The average size of the obtained alloyed particle of Ag and Au was 20 nm as shown in FIG. 6.

All of the references cited herein are incorporated by reference in their entirety.

TABLE 1

Properties of-organized surfactant-assemblies

| | Aqueous micelle | Reverse micelle | Microemulsion | Monolayers | BLMS | Vesicles |
|---|---|---|---|---|---|---|
| Method of preparation | Dissolving appropriate (above the CMC) Concentration of surfactant in water | Dissolving appropriate concentration of surfactant in an apolar solvent and adding small amounts of water | Dissolving appropriate concentration of surfactant and co-surfactant in water or oil | Spreading the surfactant (or a dilute solution of it in an organic solvent) on water surface | Painting a dilute surfactant on a Teflon pin hole | Shaking thin films of lipids (or surfactants) in water or ultra-sonication, of alcohol injection, or detergent dilution |
| Weight-averaged MW | 2000–6000 | 2000–6000 | $10^4$–$10^7$ | Depends on area covered and density of coverage | Depends on area covered and density of coverage | $>10^7$ |
| Hydrodynamic diameter (Å) | 40–100 | 40–100 | 50–5000 | Depends on area covered and density of coverage | Depends on area covered and density of coverage | 300–10000 |
| Time scale of monomer aggregate formation, breakdown | $10^{-4}$–$10^{-6}$ s | $10^{-4}$–$10^{-6}$ s | $10^{-4}$–$10^{-6}$ s | Monomer to sub phase, minutes-hours | Monomer to plateau, minutes-hours | Monomer to bulk, minutes-hours |
| Stability Dilution by water | Months Destroyed | Months Water pools, enlarges W/O microemulsion formed | Months Depends on the phase diagrams | Days, weeks | Hours | Week-months Unaltered |
| Number of reactants | Few | Few | Large | Large | Large | Large |
| Solubilization sites | Distributed around and within the Stern layer, no deep penetration | Aqueous inner pool, inner surface, surfactant tail | Aqueous inner pool, inner surface, surfactant tail | Intercalation and surface | Either or both sides of the bilayer or with the bilayer | Inner pool, outer surface, bilayer |

What is claimed is:

1. A method for making a nano-sized silver particle comprising:
  (i) preparing an aqueous silver salt solution;
  (ii) preparing an aqueous solution comprising a silver ion reducing agent;
  (iii) preparing a polyoxyethylene (2) sorbitan monolaurate or sodium dodecyl sulfate surfactant solution; and
  (iv) mixing the solutions prepared in steps (i–iii) in any order to form a nano-sized silver particle, wherein the polyoxyethylene (20) sorbitan monolaurate or sodium dodecyl sulfate surfactant is present at least in the solution prepared in steps (ii–iii).

2. The method according to claim 1, wherein said surfactant is present in 0.01–10 weight % when the solutions prepared in steps (i–iii) are combined.

3. The method according to claim 1, wherein said reducing agent is hydrazine, $NaBH_4$, $LiBH_4$, $LiAlH_4$, ethylene glycol, an ethylene oxide based chemical, or an alcohol.

4. The method according to claim 3, wherein said reducing agent is hydrazine.

5. The method according to claim 1, wherein the nano-sized particle has a diameter of less than 20 nanometers.

6. A method for making a nano-sized silver alloyed particle comprising:
  (i) preparing separately or together an aqueous silver salt solution and an aqueous inorganic element salt solution, wherein said inorganic element is other than silver;
  (ii) preparing separately or together an aqueous solution comprising a silver ion reducing agent and an aqueous solution comprising an inorganic element ion reducing agent;
  (iii) preparing a polyoxyethylene (20) sorbitan monolaurate or sodium dodecyl sulfate surfactant solution; and
  (iv) mixing the solutions prepared in steps (i–iii) in any order to form a nano-sized particle of silver alloyed with said inorganic element, wherein the polyoxyethylene (20) sorbitan monolaurate or sodium dodecyl sulfate surfactant is present at least in the solutions prepared in steps (ii–iii).

7. The method according to claim 6, wherein said surfactant is present in 0.01–10 weight % when the solutions prepared in steps (i–iii) are combined.

8. The method according to claim 6, wherein said reducing agent is hydrazine, $NaBH_4$, $LiBH_4$, $LiAlH_4$, ethylene glycol, an ethylene oxide based chemical, or an alcohol.

9. The method according to claim 6, wherein said inorganic element is gold, palladium, platinum, aluminium, cadmium or sulfur.

10. The method according to claim 6, wherein the nano-sized particle has a diameter of less than 20 nanometers.

* * * * *